United States Patent
Chiu et al.

(10) Patent No.: US 8,654,511 B2
(45) Date of Patent: Feb. 18, 2014

(54) CAPACITANCE UNIT AND STACKED SOLID ELECTROLYTIC CAPACITOR

(75) Inventors: Chi-Hao Chiu, Hsinchu (TW); Ching-Feng Lin, Hsinchu County (TW); Kun-Huang Chang, Hsinchu (TW)

(73) Assignee: Apaq Technology Co., Ltd., Miaoli County (TW)

( * ) Notice: Subject to any disclaimer, the term of this patent is extended or adjusted under 35 U.S.C. 154(b) by 194 days.

(21) Appl. No.: 13/178,464

(22) Filed: Jul. 7, 2011

(65) Prior Publication Data

US 2013/0010404 A1 Jan. 10, 2013

(51) Int. Cl.
*H01G 5/38* (2006.01)

(52) U.S. Cl.
USPC .......................................... 361/541; 361/532

(58) Field of Classification Search
USPC .......................... 361/523–529, 532, 540–541
See application file for complete search history.

(56) References Cited

U.S. PATENT DOCUMENTS

| | | | |
|---|---|---|---|
| 6,392,869 B2 * | 5/2002 | Shiraishi et al. | 361/523 |
| 6,890,363 B1 * | 5/2005 | Sakai et al. | 29/25.03 |
| 2009/0135550 A1 * | 5/2009 | Umemoto et al. | 361/523 |
| 2010/0296227 A1 * | 11/2010 | Chacko | 361/523 |
| 2011/0090621 A1 * | 4/2011 | Chacko et al. | 361/523 |
| 2011/0261503 A1 * | 10/2011 | Aoyama | 361/524 |

FOREIGN PATENT DOCUMENTS

JP    2003257798 A  *  9/2003

* cited by examiner

*Primary Examiner* — Eric Thomas
(74) *Attorney, Agent, or Firm* — Li & Cai Intellectual Property (USA) Office

(57) ABSTRACT

A capacitance unit includes an anode portion, an insulating portion, a cathode portion and a colloid portion. The front end of the anode portion extends to from an anode terminal. The insulating portion surrounds the anode portion and covers a first partial surface of the anode portion. The cathode portion is disposed next to the insulating portion, and the cathode portion covers a second partial surface of the anode portion. The colloid portion is disposed next to the insulating portion, and the colloid portion surrounds the cathode portion and covers a partial surface of the cathode portion.

9 Claims, 3 Drawing Sheets

CAPACITANCE UNIT AND STACKED SOLID ELECTROLYTIC CAPACITOR

BACKGROUND OF THE INVENTION

1. Field of the Invention

The present invention relates to a capacitance unit and a stacked solid electrolytic capacitor. In particular, the present invention relates to a capacitance unit and a stacked solid electrolytic capacitor having uniform thickness.

2. Description of Related Art

Capacitors are widely used in modern electronic products for storing electrical charge, filtering, bypassing or tune-oscillating. Because of the different capacitor properties, capacitors in different types are chosen in different applications. Solid electrolytic capacitors have properties of high capacity, a small size, high-frequency characteristics and low manufacturing cost; therefore, the solid electrolytic capacitors are more and more used in various applications, such as electric devices and electronic products.

Please refer to FIGS. 1A and 1B; the traditional capacitors are shown. Due to the structure and the manufacturing processes in the traditional method, it is needed to change the size and the shape of the traditional capacitor. For example, the difference between the front-end thickness S1 and the rear-end thickness S2 is large; therefore, the stacked capacitor unit similarly has an issue of un-uniform thickness between the front-end thickness W1 and the rear-end thickness W2. The thicker end of the stacked capacitor unit, i.e., the rear end, results in the thin wall thickness of the packaging material. Further, the thin wall thickness of the packaging material causes the low mechanical strength of the packaging material so that the inner material may be exposed easily, or the airtightness of the packaging material may be decreased. In other words, the moisture may affect the capacitor performance so that the electrical properties of the capacitor are un-stable and the current leakage may occur.

The above-mentioned issues affect the capacitor performance and the safety of the electrical circuit. What is needed is providing solid electrolytic capacitors and stacked solid electrolytic capacitors that have small sizes, uniform thicknesses and high packaging strength to overcome the foregoing disadvantages.

SUMMARY OF THE INVENTION

The instant disclosure provides a capacitance unit and a stacked solid electrolytic capacitor.

The instant disclosure provides a capacitance unit which includes an anode portion, an insulating portion, a cathode portion and a colloid portion. The front end of the anode portion extends to from an anode terminal. The insulating portion surrounds the anode portion and covers a first partial surface of the anode portion. The cathode portion is disposed next to the insulating portion, and the cathode portion covers a second partial surface of the anode portion. The colloid portion is disposed next to the insulating portion, and the colloid portion surrounds the cathode portion and covers a partial surface of the cathode portion.

The instant disclosure further provides a stacked solid electrolytic capacitor which includes two capacitor modules, an anode conduction unit, a cathode conduction unit and a packaging unit. Each capacitor module has at least one capacitance unit and the capacitance unit has an anode portion, a cathode portion, an insulating portion and a colloid portion. The insulating portion surrounds the anode portion and covers a first partial surface of the anode portion. The cathode portion is disposed next to the insulating portion and covers a second partial surface of the anode portion. The colloid portion is disposed next to the insulating portion, and the colloid portion surrounds the cathode portion and covers a partial surface of the cathode portion. The anode conduction unit has at least one anode lead frame and the anode lead frame is welded with the anode terminal. The cathode conduction unit is connected to the cathode portion on the upper surface and the lower surface thereof via conductive glue. The packaging unit covers the two capacitor units, a part of the anode conduction unit and a part of the cathode conduction unit.

The instant disclosure still further provides a stacked solid electrolytic capacitor which includes one capacitor module, an anode conduction unit, a cathode conduction unit and a packaging unit. The capacitor module has a plurality of capacitance units and each capacitance unit has an anode portion, a cathode portion, an insulating portion and a colloid portion. The front end of the anode portion extends to from an anode terminal. The insulating portion surrounds the anode portion and covers a first partial surface of the anode portion. The cathode portion is disposed next to the insulating portion and covers a second partial surface of the anode portion. The colloid portion is disposed next to the insulating portion, and the colloid portion surrounds the cathode portion and covers a partial surface of the cathode portion. The anode conduction unit has at least one anode lead frame and the anode lead frame is welded with the anode terminal. The cathode conduction unit is connected to the cathode portion on the upper surface and the lower surface thereof via conductive glue. The packaging unit covers the two capacitor units, a part of the anode conduction unit and a part of the cathode conduction unit The colloid portion, in the exemplary embodiments, covers a partial surface of the cathode portion so that the thickness of the manufactured capacitance unit is uniform. As a result, the packaging unit has improved packaging strength and the inner materials are protected completely so as to improve the airtightness. Therefore, the capacitor is protected from moisture so that the final product has stable electrical property and the issue of current-leakage is avoided.

For further understanding of the present invention, reference is made to the following detailed description illustrating the embodiments and examples of the present invention. The description is for illustrative purpose only and is not intended to limit the scope of the claim.

DETAILED DESCRIPTION OF THE PREFERRED EMBODIMENTS

The first exemplary embodiment is shown below.

Figure 2:
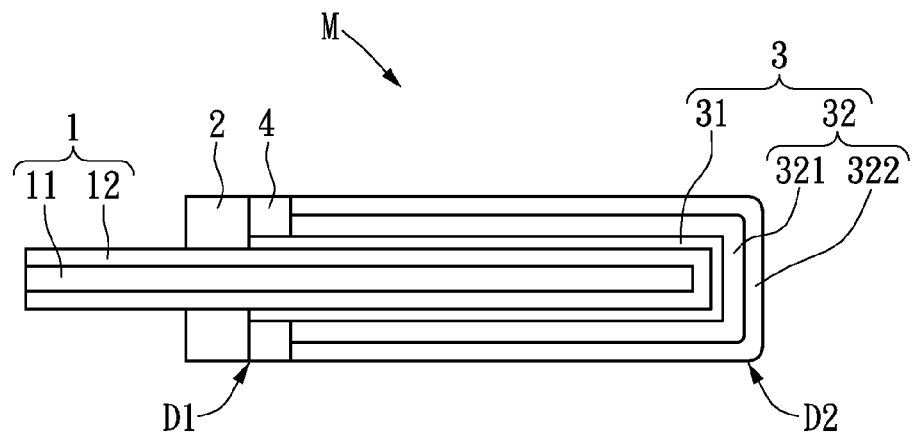
FIG. 2 shows the cut-view of the first embodiment of the capacitance unit according to the instant disclosure.
Figure 3:
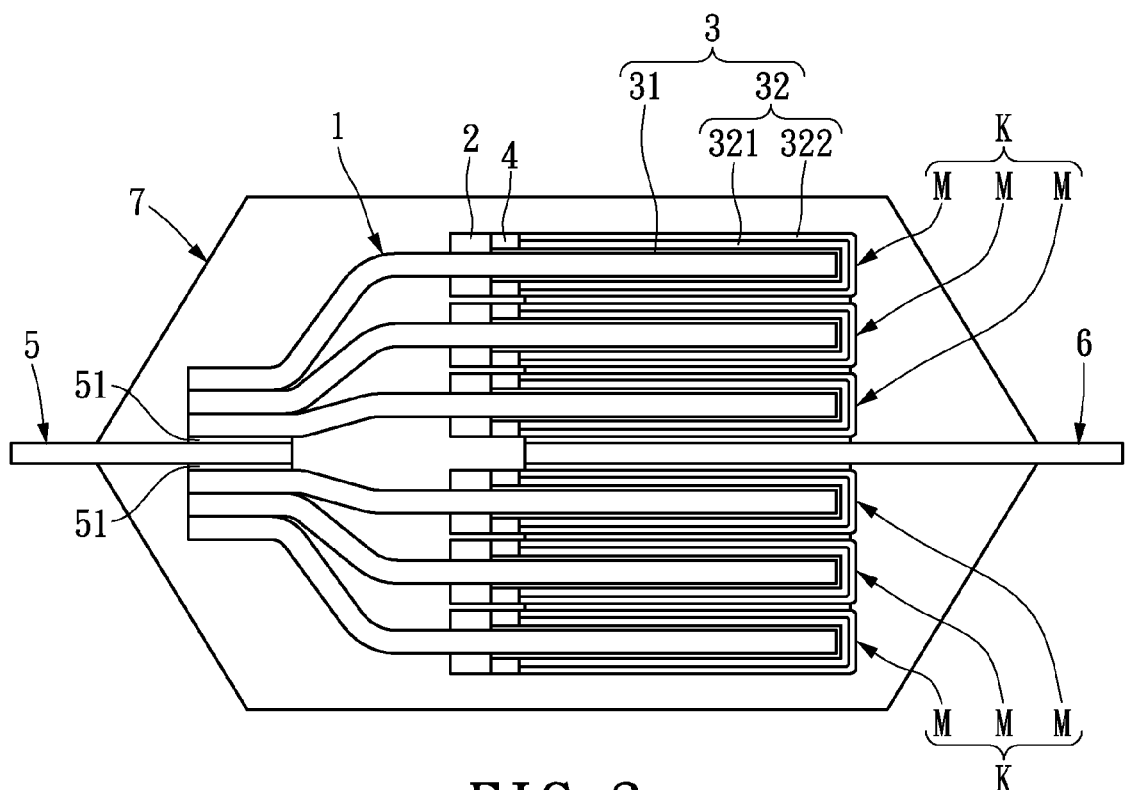
FIG. 3 shows the side view of the first embodiment of the stacked solid electrolytic capacitor according to the instant disclosure.

Please refer to FIGS. 2 and 3; the instant disclosure provides the first embodiment of the stacked solid electrolytic capacitor which includes two capacitor modules K, an anode conduction unit 5, a cathode conduction unit 6 and a packaging unit 7.

Each of the two capacitor modules K has a plurality of capacitance units M and each of the capacitance units M has an anode portion 1, a cathode portion 3, an insulating portion 2 and a colloid portion 4.

In detail, the anode portion 1 is constructed by an aluminum foil 11 and a dielectric layer 12 of aluminum oxide covered on the aluminum foil 11. The anode portion 1 is insulated from the cathode portion 3 by the dielectric layer 12.

Furthermore, the insulating portion 2 surrounds the anode portion 1 and covers a first partial surface of the anode portion 1. Similar with the dielectric layer 12, the insulating portion 2 provides the insulation function between the anode portion 1 and the cathode portion 3.

The cathode portion 3 is disposed next to the insulating portion 2 and the cathode portion 3 covers a second partial surface of the anode portion 1. The cathode 3 has a conductive-polymer layer 31 and a conductive-colloid layer 32. The conductive-polymer layer 31 is disposed next to the insulating portion 2 and covers the second partial surface of the anode portion 1, and the conductive-colloid layer 32 covers the conductive-polymer layer 31. The conductive-colloid layer 32 has a carbon-paste layer 321 and a silver-paste layer 322. The carbon-paste layer 321 covers the conductive-polymer layer 31 and the silver-paste layer 322 covers the carbon-paste layer 321. In other words, the cathode portion 3 includes an inner layer of U-shaped conductive-polymer layer 31, a middle layer of U-shaped carbon-paste layer 321 and an outer layer of the silver-paste layer 322.

In addition, the colloid portion 4 is disposed next to the insulating portion 2. The colloid portion 4 surrounds the cathode portion 3 and covers a partial surface of the cathode portion 3. The colloid portion 4 could be a conductive colloid portion or an insulating colloid portion, which is formed by curing conductive colloids or insulating colloids.

The cathode portion 3 of the capacitance unit M has a first end D1 close to the insulating portion 2 and a second end D2 away from the insulating portion 2. The ratio of the thickness of the first end D1 to the thickness of the second end D2 is ranged from 1.1 to 2.0. In other words, the thickness of the first end D1 is similar with that of the second end D2.

An anode terminal may be formed on the front end of the anode portion 1 and the anode terminal extends in a predetermined distance. In addition, the anode terminal may have bending portions for usage.

The anode conduction unit 5 has at least one anode lead frame 51. By welding the anode lead frame 51 onto the anode terminals of the two capacitor modules K, the capacitor module K is electrically connected with the anode conduction unit 5.

Similarly, the cathode conduction unit 6 is connected to the cathode portions 3 of the two capacitor modules K on the upper surface and the lower surface thereof via conductive glue. In other words, the capacitor module K is connected with the cathode conduction unit 6 by the conductive glue.

Figure 1A:
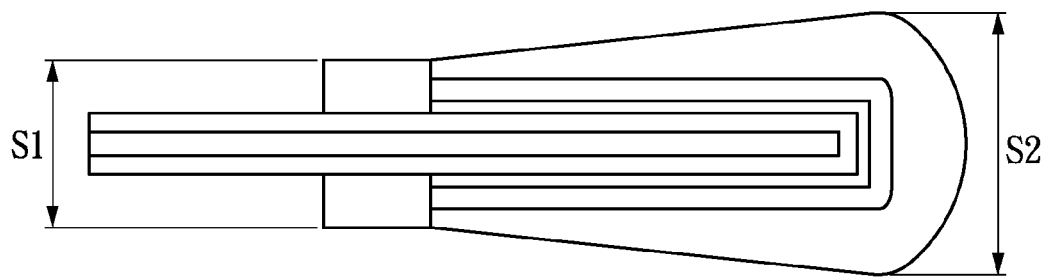
FIG. 1A shows a capacitor of the related art.
Figure 1B:
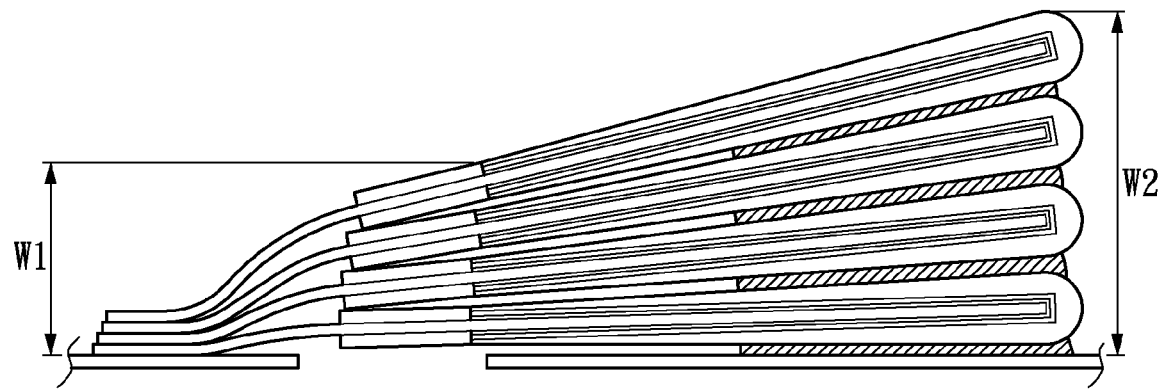
FIG. 1B shows a stacked capacitor of the related art.

The packaging unit 7 covers the two capacitor units K, a part of the anode conduction unit 5 and a part of the cathode conduction unit 6. The packaging unit 7 protects the capacitor units K from the moisture or dust in the environment, and from the impact. Furthermore, the packaging unit 7 isolates and insulates the capacitor units K. Due to the size difference of the stacked solid electrolytic capacitor of the instant disclosure is smaller than the difference between W1 and W2 shown in FIG. 1B, the packaging unit 7 may package and cover the capacitor units K in a complete and an integral manner. The packaged capacitor has a uniform thickness to reduce the occupied volume and further to shrink the final product.

The manufacturing method of the stacked solid electrolytic capacitor is introduced hereinafter.

The first step is providing two capacitor units K and each capacitor unit K has a plurality of capacitance units M. As shown, each capacitor unit K has multi capacitance units M stacked with each other. Each of the capacitance units M has an anode portion 1, a cathode portion 3, an insulating portion 2 and a colloid portion 4. An anode terminal may be formed on the front end of the anode portion 1. The insulating portion 2 surrounds the anode portion 1 and covers a first partial surface of the anode portion 1, and the portion 3 is disposed next to the insulating portion 2 to cover a second partial surface of the anode portion 1. The colloid portion 4 is disposed next to the insulating portion 2. The colloid portion 4 is formed by a wheel-printing method to surround the cathode portion 3 and to cover a partial surface of the cathode portion 3. Moreover, the cathode portion 3 of one of the capacitance units M is electrically connected to the cathode portion 3 of the adjacent capacitance unit M by conductive glue.

Next step is electrically connecting the two capacitor units K to the anode conduction unit 5 and the cathode conduction unit 6. The anode conduction unit 5 has at least one anode lead frame 51. The anode lead frame 51 and the anode terminals of the two capacitor modules K are welded and electrically connected with each other. The cathode conduction unit 6 is connected to the cathode portions 3 of the two capacitor modules K on the upper surface and the lower surface thereof via conductive glue, for example a silver paste.

Next step is packaging the two capacitor units K, a part of the anode conduction unit 5 and a part of the cathode conduction unit 6 to form the packaging unit 7.

The above-mentioned wheel-printing method has the following steps:

The first step is preparing an insulating paste or a conductive paste in a row-material tank of the wheel-printing tool.

The next step is stirring the paste in the row-material tank by a stirring wheel to uniformly distribute the paste and further to prevent the paste from curing.

While the stirring wheel operating, a printing wheel is dipped into the paste and the surface of the printing wheel is covered by the un-cured paste. The printing wheel is then transferred on the cathode portion to print the paste on the desired portion of the cathode portion so that the colloid portion 4 is formed.

After curing the paste printed on the surface of the cathode portion, the cathode portion is turned upside-down to print the paste on the opposite surface thereof. As a result, the complete colloid portion 4 is formed on the cathode portion.

Accordingly, the colloid portion 4 is formed by the introduced wheel-printing method on the first exemplary embodiment.

The second exemplary embodiment is shown below.

Figure 4:
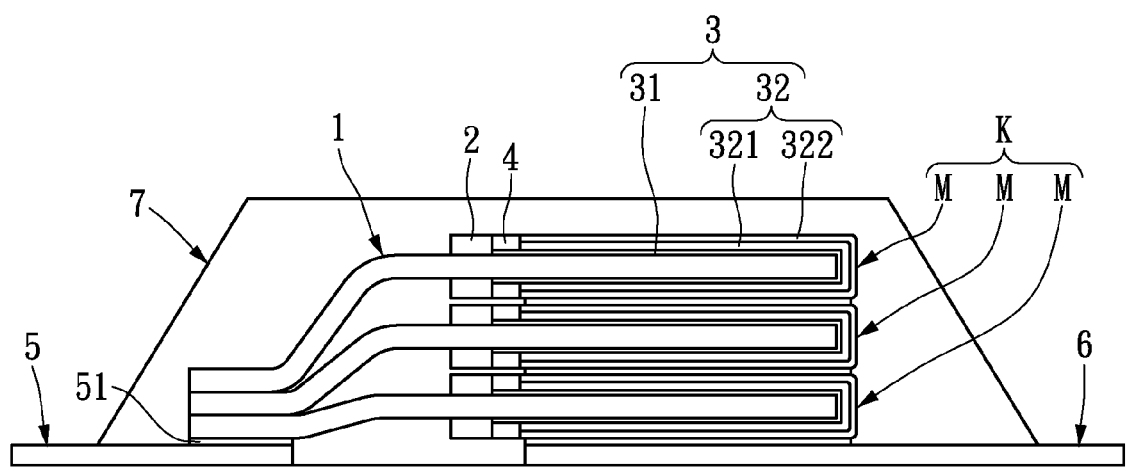
FIG. 4 shows the side view of the second embodiment of the stacked solid electrolytic capacitor according to the instant disclosure.

As shown in FIG. 4, the second exemplary embodiment provides a stacked solid electrolytic capacitor which includes a capacitor unit K, an anode conduction unit 5, a cathode conduction unit 6 and a packaging unit 7. The capacitor module K has a plurality of capacitance units M and each of the capacitance units M has an anode portion 1, a cathode portion 3, an insulating portion 2 and a colloid portion 4. An anode terminal may be formed on the front end of the anode portion 1. The insulating portion 2 surrounds the anode portion 1 and covers a first partial surface of the anode portion 1, and the cathode portion 3 is disposed next to the insulating portion 2 and covers a second partial surface of the anode portion 1. The colloid portion 4 is disposed next to the insulating portion 2. The colloid portion 4 surrounds the cathode portion 3 and covers a partial surface of the cathode portion 3.

The anode conduction unit 5 has at least one anode lead frame 51. The anode lead frame 51 and the anode terminals of the capacitor module K are welded and electrically connected with each other. The cathode conduction unit 6 is connected to the cathode portions 3 of the capacitor module K on the upper surface and the lower surface thereof via conductive glue. The packaging unit 7 covers the capacitor unit K, a part of the anode conduction unit 5 and a part of the cathode conduction unit 6.

In structural difference between the first and the second embodiment, the capacitor unit K is only arranged on one side of the anode and cathode conduction units 5, 6. By arranging the capacitor unit K and the capacitance units M, the size and the capacity of the final product may be flexibly adjusted.

The present invention at least has the following characteristics. The thickness of the final capacitor is uniform because the colloid portion covers a partial surface of the cathode portion. Accordingly, the packaging strength may be improved and the inner materials are completely covered and protected. The colloid portion has high airtightness for keeping the capacitor materials from moisture so that the electrical property is stable and the current-leakage is avoided.

The description above only illustrates specific embodiments and examples of the present invention. The present invention should therefore cover various modifications and variations made to the herein-described structure and operations of the present invention, which fall within the scope of the present invention as defined in the following appended claims.

What is claimed is:

1. A capacitance unit comprising:
    an anode portion having a first anode unit, a second anode unit and a third anode unit connected between the first anode unit and the second anode unit;
    an insulating portion disposed on and around the third anode unit, wherein the insulating portion is disposed between the first anode unit and the second anode unit, and the first anode unit is exposed from the insulating portion;
    a first conductive layer connected to the insulating portion and enclosing the second anode unit;
    a conductive colloid portion connected to the insulating portion and disposed on and around the first conductive layer; and
    a second conductive layer connected to the conductive colloid portion and enclosing the first conductive layer, wherein the conductive colloid portion is connected between the insulating portion and the second conductive layer, and the first conductive layer and the second conductive layer are connected with each other to form a cathode portion.

2. The capacitance unit as claimed in claim 1, wherein the first conductive layer is a conductive-polymer layer, the second conductive layer is a conductive-colloid layer, and the conductive-colloid layer has a carbon-paste layer connected to the conductive colloid portion and enclosing the conductive-polymer layer and a silver-paste layer connected to the conductive colloid portion and enclosing the carbon-paste layer.

3. The capacitance unit as claimed in claim 1, wherein the cathode portion has a first end close to the insulating portion and a second end away from the insulating portion, the ratio of the thickness of the first end to the thickness of the second end is ranged from 1.1 to 2.0.

4. A stacked solid electrolytic capacitor, comprising:
    two capacitor modules, each capacitor module having a plurality of capacitance units,
        wherein each capacitance unit includes:
            an anode portion having a first anode unit, a second anode unit and a third anode unit connected between the first anode unit and the second anode unit;
            an insulating portion disposed on and around the third anode unit, wherein the insulating portion is disposed between the first anode unit and the second anode unit, and the first anode unit is exposed from the insulating portion;
            a first conductive layer connected to the insulating portion and enclosing the second anode unit;
            a conductive colloid portion connected to the insulating portion and disposed on and around the first conductive layer; and
            a second conductive layer connected to the conductive colloid portion and enclosing the first conductive layer, wherein the conductive colloid portion is connected between the insulating portion and the second conductive layer, and the first conductive layer and the second conductive layer are connected with each other to form a cathode portion;
    a packaging unit enclosing the two capacitor modules;
    an anode conduction unit has a first portion electrically connected to the first anode unit of the anode portion and a second portion connected to the first portion of the anode conduction unit and enclosed by the packaging unit; and
    a cathode conduction unit has a first portion electrically connected to the cathode portion and a second portion connected to the first portion of the cathode conduction unit and enclosed by the packaging unit.

5. The stacked solid electrolytic capacitor as claimed in claim 4, wherein the first conductive layer is a conductive-polymer layer, the second conductive layer is a conductive-colloid layer, and the conductive-colloid layer has a carbon-paste layer connected to the conductive colloid portion and enclosing the conductive-polymer layer and a silver-paste layer connected to the conductive colloid portion and enclosing the carbon-paste layer.

6. The stacked solid electrolytic capacitor as claimed in claim 4, wherein the cathode portion has a first end close to the insulating portion and a second end away from the insulating portion, the ratio of the thickness of the first end to the thickness of the second end is ranged from 1.1 to 2.0.

7. A stacked solid electrolytic capacitor, comprising:
    a capacitor module having a plurality of capacitance units,
        wherein each capacitance unit includes:
            an anode portion having a first anode unit, a second anode unit and a third anode unit connected between the first anode unit and the second anode unit;
            an insulating portion disposed on and around the third anode unit, wherein the insulating portion is disposed between the first anode unit and the second anode unit, and the first anode unit is exposed from the insulating portion;
            a first conductive layer connected to the insulating portion and enclosing the second anode unit;
            a conductive colloid portion connected to the insulating portion and disposed on and around the first conductive layer; and a second conductive layer connected to the conductive colloid portion and enclosing the first conductive layer, wherein the conductive colloid portion is connected between the insulating portion and the second conductive layer, and the first conductive layer and the second conductive layer are connected with each other to form a cathode portion;

a packaging unit enclosing the capacitor module;

an anode conduction unit has a first portion electrically connected to the first anode unit of the anode portion and a second portion connected to the first portion of the anode conduction unit and enclosed by the packaging unit; and a cathode conduction unit has a first portion electrically connected to the cathode portion and a second portion connected to the first portion of the cathode conduction unit and enclosed by the packaging unit.

8. The stacked solid electrolytic capacitor as claimed in claim 7, wherein the first conductive layer is a conductive-polymer layer, the second conductive layer is a conductive-colloid layer, and the conductive-colloid layer has a carbon-paste layer connected to the conductive colloid portion and enclosing the conductive-polymer layer and a silver-paste layer connected to the conductive colloid portion and enclosing the carbon-paste layer.

9. The stacked solid electrolytic capacitor as claimed in claim 7, wherein the cathode portion has a first end close to the insulating portion and a second end away from the insulating portion, the ratio of the thickness of the first end to the thickness of the second end is ranged from 1.1 to 2.0.

* * * * *